Nov. 2, 1954  E. E. BELZER ET AL  2,693,072
GRASS SEED HARVESTER
Filed Oct. 29, 1952  4 Sheets-Sheet 1

Emiel E. Belzer
Vern E. Belzer
INVENTORS

Nov. 2, 1954 E. E. BELZER ET AL 2,693,072
GRASS SEED HARVESTER
Filed Oct. 29, 1952 4 Sheets-Sheet 3

Emiel E. Belzer
Vern E. Belzer INVENTORS

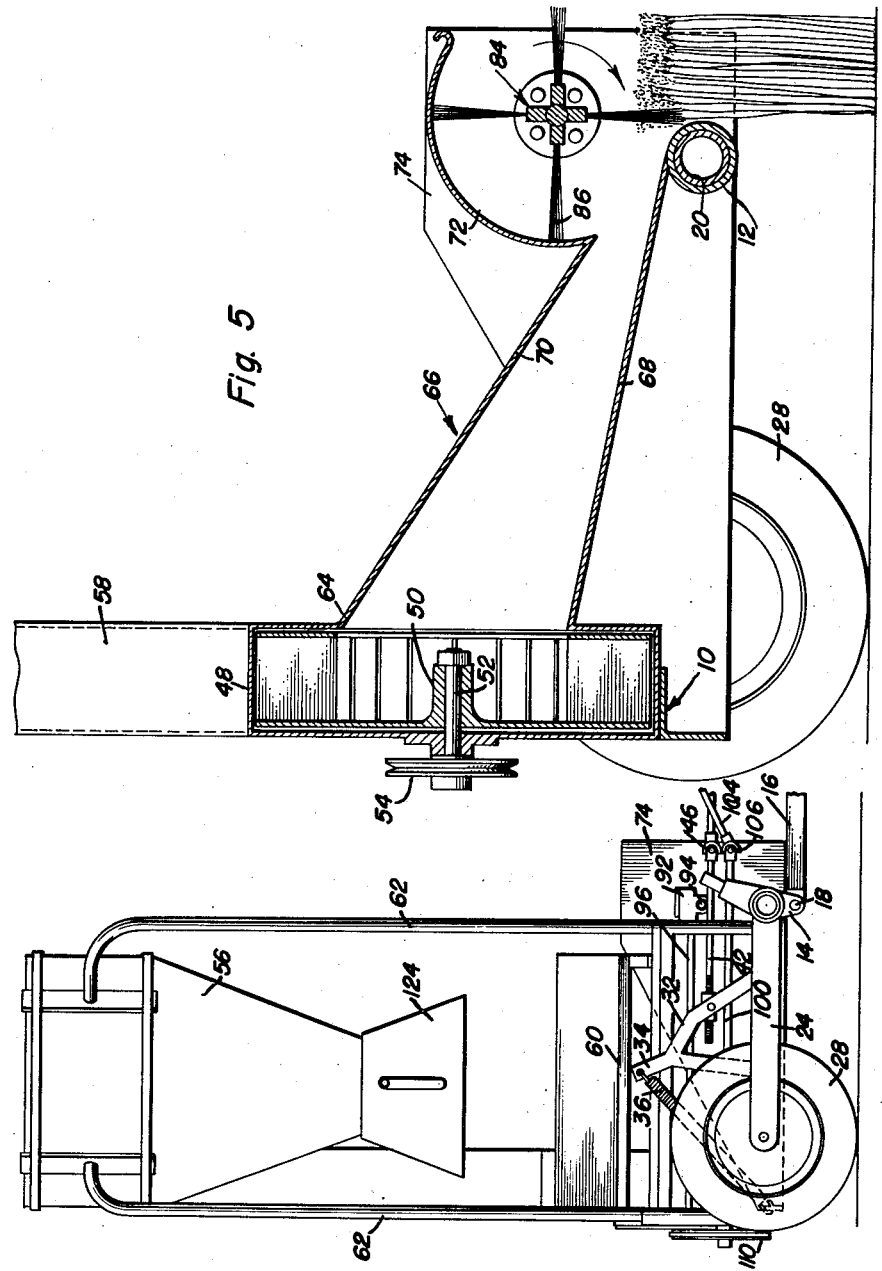

United States Patent Office 2,693,072
Patented Nov. 2, 1954

2,693,072

GRASS SEED HARVESTER

Emiel E. Belzer and Vern E. Belzer, De Smet, S. Dak., said Vern E. Belzer assignor to said Emiel E. Belzer Application October 29, 1952, Serial No. 317,524

11 Claims. (Cl. 56—126)

This invention relates to new and useful improvements in grass seed harvesters and the primary object of the present invention is to provide a machine that will effectively wipe seeds from the tops of grass without destroying the seeds by beating or flaying.

Another important object of the present invention is to provide a grass seed harvester including a suction chamber that will draw the seeds wiped from the tops of the grass so that the seed as harvested requires only cleaning and can then be sacked for final storage due to the drying action in the suction chamber.

Yet another object of the present invention is to provide a grass seed harvester involving a suction type collector that will increase the harvest of seed per acre by effectively collecting the light grass seeds which are frequently lost by other type harvesters.

A further object of the present invention is to provide a grass seed harvester including a horizontal frame member which reinforces and strengthens the harvester and which also forms a bearing for the wheel mounting shaft and a wiper bar for a power driven brush.

A still further aim of the present invention is to provide a grass seed harvester machine of the aforementioned character including means operatively connected to the shaft for rotating the same to move the frame member relative to wheels eccentrically mounted on the shaft, whereby the frame member may be adjusted vertically in accordance with the height of grass whose seeds are being harvested by the machine.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 4 is a side elevational view of Figure 1;

Figure 5 is an enlarged detail vertical sectional view taken substantially on the plane of section line 5—5 of Figure 1; and Figure 6 is an enlarged detail vertical sectional view of Figure 3 to show the manner in which the wiper member or brush is mounted on the frame.

Figure 1:
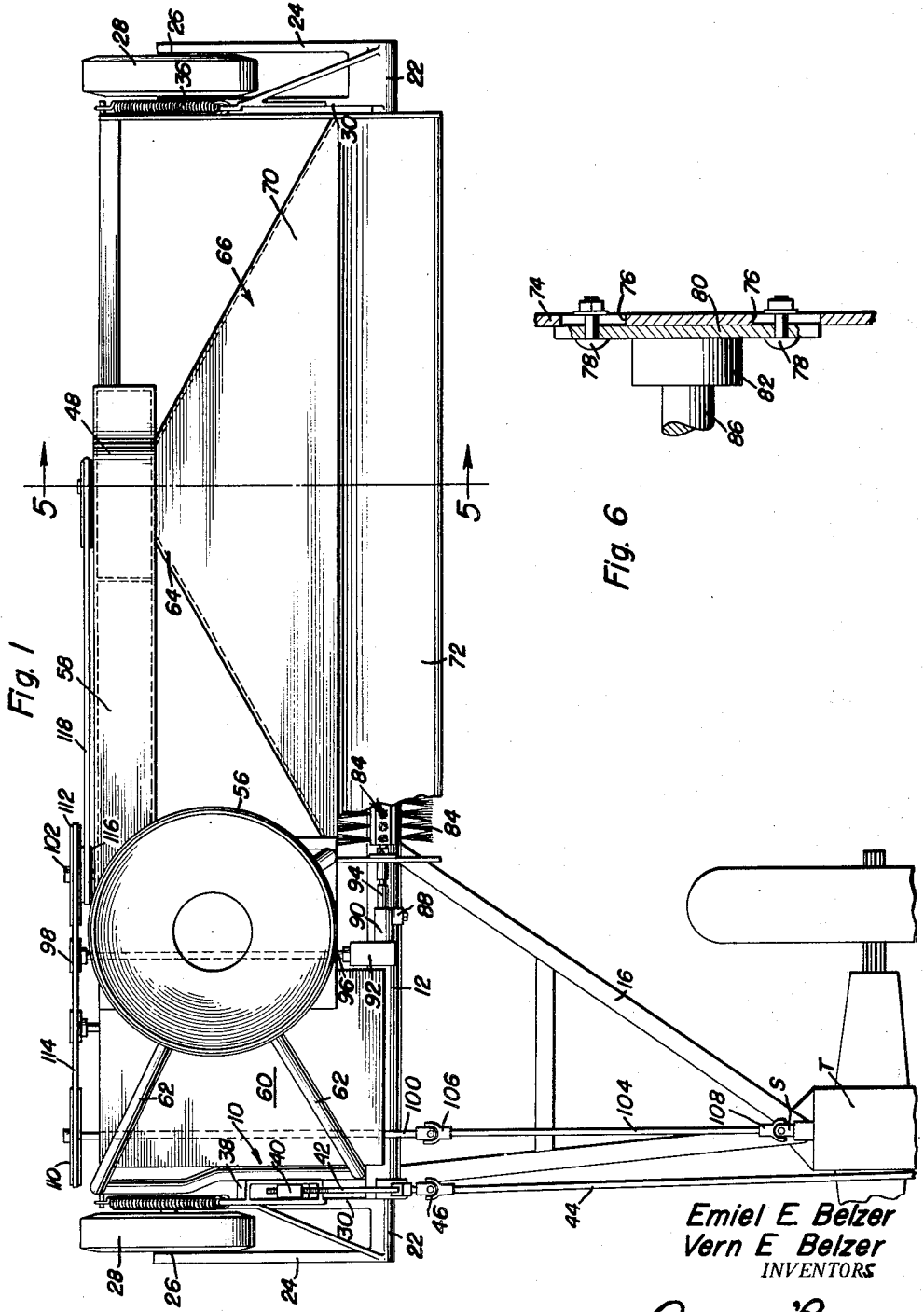
Figure 1 is a top plan view with parts broken away of the present invention and showing the same hitched to the rear end of a tractor.
Figure 2:
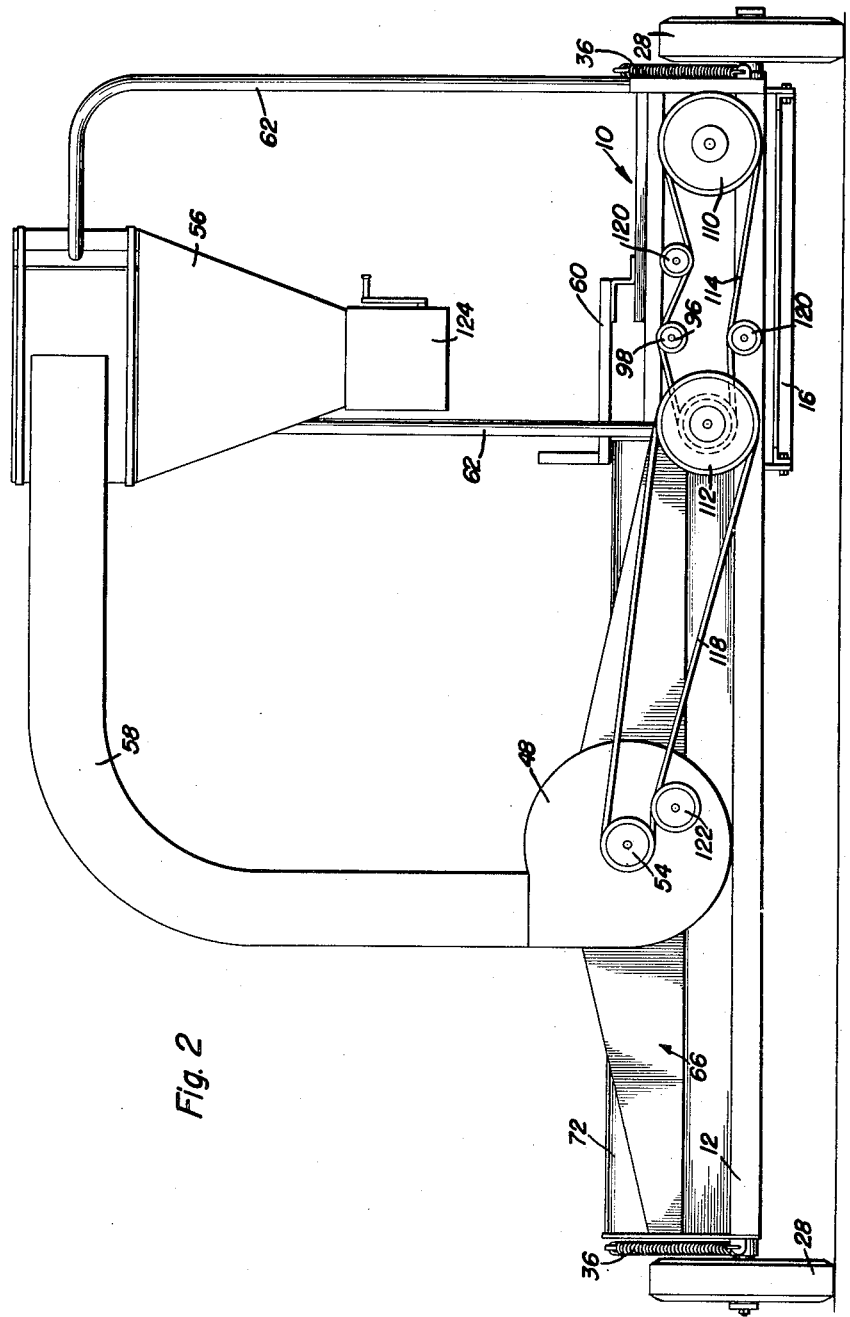
Figure 2 is a rear elevational view of Figure 1.
Figure 3:
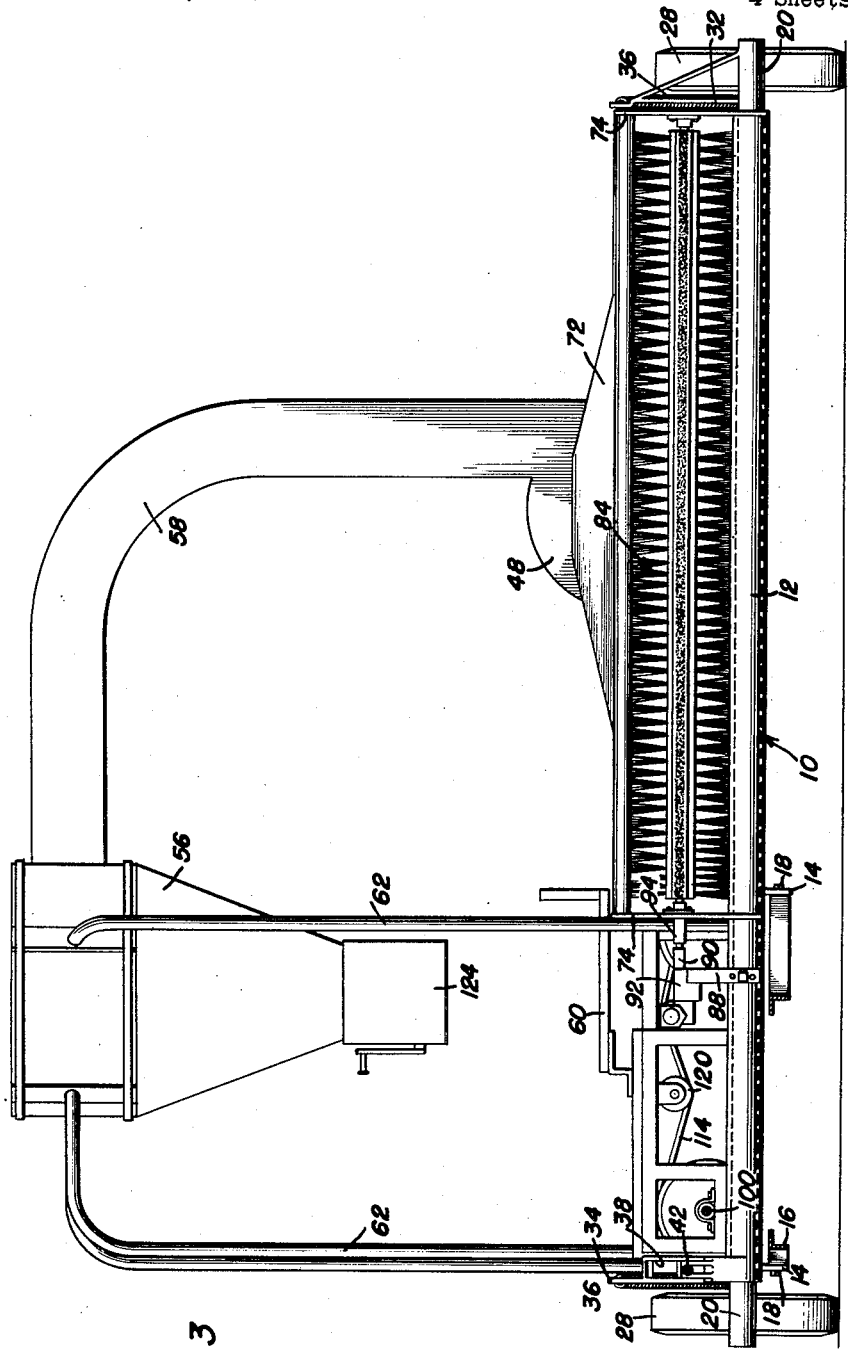
Figure 3 is a front elevational view with parts in section of Figure 1 but with the hitch means broken away.

Referring now to the drawings in detail, wherein for the purpose of illustration, there is disclosed a preferred embodiment of the present invention, the numeral 10 represents an elongated wheeled frame or support including a longitudinally extending horizontally disposed tubular frame member 12. A pair of rigid ears 14 are fixed to and depend from one end portion of frame member 12 and are pivotally and removably secured to the rear ends of a substantially angle iron A-hitch frame 16 by pins 18. The forward end or apex of A-hitch frame 16 is suitably connected to the rear end of a tractor T so that the frame 10 may be pulled by the tractor.

A wheel mounting rock shaft or axle 20 is positioned in and extends completely axially through frame member 12. The laterally projecting forward tubular ends 22 of rearwardly extending arms 24 are suitably fixed over the outer ends of shaft 20. The rear ends of arms 24 fixedly support stub axles 26 for preferably pneumatic ground wheels 28.

Rearwardly extending bracket arms 30 are fixed to and braced to the ends 22 and fixedly support upstanding inverted V-shaped brackets 32 having extensions 34 at their apices that are apertured to engage the forward hook ends of coil springs 36. The rear ends of the springs 36 are attached to the rear corners of the frame 10 to yieldingly retain the arms 24 in a horizontal position as shown in Figure 4. The bracket 32 at the end of the frame 10 supporting the hitch frame, fixedly supports a channel 38 that coacts with its bracket in pivotally supporting an internally threaded sleeve nut 40.

The screw threaded end of a rod 42 is threaded through the sleeve nut 40 and the forward end of rod 42 is connected to an operating shaft 44 by a universal joint 46. The shaft 44 will extend to tractor T adjacent the tractor driver to be manually rotated as is well known to adjust frame 10.

A suction fan 48 is suitably mounted on the frame 10 and includes an impeller 50 that is secured upon a horizontal shaft 52. The rear end of shaft 52 projects outwardly from the fan 48 and supports a pulley 54 to which the power take off shaft S of the tractor T will be connected in a manner presently to be described. The outlet of suction fan 48 is connected to the intake of a seed dust collector 56 by a duct 58. The collector 56 is supported in an elevated position over the platform portion 60 of the frame 10 by frame posts 62 forming part of frame 10.

The rear apex portion 64 of a forwardly and outwardly flared suction-chamber forming casing 66 is suitably fixed to the intake side of the suction fan 48. The lower flat wall 68 of the casing 66 is fixed at its forward edge to the upper periphery of the frame member 12 as shown in Figure 5. The downwardly and forwardly sloping upper wall 70 of casing 66 terminates in a concave-convexed forwardly facing plate 72 that overlies the frame member 12.

The sides of the casing 66 are enlarged at their forward ends, as at 74, and are joined with the ends of plate 72. The enlarged ends 74 are provided with vertical slots 76 that receive fasteners 78 carried by the flanged bases 80 of bearings 82, whereby the bearings 82 may be vertically adjusted, as shown in Figure 6.

A horizontal wiper member or brush 84 includes a supporting shaft 86 whose ends are journaled in the bearings 82. The wire bristles 86 of the wiper member 84 have wiping contact with the upper periphery of the frame member 12 as shown in Figure 5 to wipe seeds from the tops or heads of grass against the frame member 12.

Frame member 12 supports a bracket 88 on which there is mounted a bearing 90 and a gear box 92 having beveled gears (not shown) therein. Bearing 90 accommodates a shaft 94 that is fixed to one end of a brush shaft 86 and bearing 92 accommodates the forward end of a rearwardly extending shaft 96. A pulley 98 is fixed on the rear end of shaft 96.

A pair of spaced parallel shafts 100 and 102 are rotatably supported on frame 10 and parallel the shaft 96. The forward end of shaft 100 is coupled to the power take off shaft S by a shaft 104 having universal joints 106 and 108 to compensate for the parallel relationship between shafts S and 100 when the frame 10 is raised or lowered. The rear end of shaft 100 supports a pulley 110 that is connected to a relatively large pulley 112 fixed on shaft 102 by an endless pulley belt 114. A relatively small pulley 116 fixed on shaft 102 is connected to pulley 54 by an endless belt 118 whereby the impeller 50 will be driven by the power take off shaft of the tractor.

The upper flight of belt 114 engages the pulley 98 and is retained in frictional contact therewith by idler pulleys 120 on the rear of frame 10. An additional pulley 122 on the exterior of fan 48 engages the pulley belt 118 to force the belt against the pulley 54.

In practical use of the present invention, the rod 42 is rotated to vertically adjust the frame 10 to the height of the grass whose seeds are being harvested. As the tractor pulls the frame 10 forwardly, the brush 84 will be driven and the impeller 50 also driven so that as the seeds from the heads of the grass are wiped from the grass and against the frame member 12, the seeds will be drawn through the suction-chamber casing 66 and forced into the collector 56.

Collector 56 is fitted with a bagging attachment 124 for sacking the seed harvested as it comes from the chamber forming casing 66.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A grass seed harvester comprising a wheeled frame including a front frame member adapted to extend perpendicular to the direction of travel of the frame, a power driven wiper member secured to the frame overlying the front frame member and having wiping contact therewith, and means on the frame for collecting seeds wiped from grass by the wiper member and means for adjusting the vertical position of the front frame member.

2. A grass seed harvester comprising a wheeled frame including a front frame member adapted to extend perpendicular to the direction of travel of the frame, a power driven wiper member secured to the frame overlying the front frame member and having wiping contact therewith, and means on the frame for collecting seeds wiped from grass by the wiper member, said means including a conduit extending rearwardly from the front frame member and including a forward mouth end portion having a bottom wall fixed to the front frame member and a concavo-convexed upper wall portion extending upwardly and forwardly over the wiper member, said wiper member engaging the upper wall portion, and means for adjusting the vertical position of the front frame member.

3. A grass seed harvester comprising a wheeled frame including a front frame member adapted to extend perpendicular to the direction of travel of the frame, a power driven wiper member secured to the frame overlying the front frame member and having wiping contact therewith, said front frame member being tubular, an axle positioned in said front member for rotation, an arm fixed to and projecting laterally from each end of the axle, wheels carried by said arms, means connected to said axle for rotating the axle and locking the axle in a selected rotated position to vertically adjust the frame relative to the wheels, and means on the frame for collecting seeds wiped from grass by said wiper member.

4. In a grass seed harvester including a frame having suction means thereon for collecting seeds and provided with an air intake, a horizontal wiper bar constituting a structural part of the frame and disposed at said air intake, and a rotary brush supported on the frame over the wiper bar and at the air intake, said brush having wiping contact with said bar for brushing seeds from the tops of grass that are brushed against the bar by the brush and means for adjusting the vertical position of the wiper bar.

5. The combination of claim 4 and a pair of ground wheels supporting the frame and having a common mounting shaft, said bar being hollow and receiving the shaft therein.

6. In a grass seed harvester including a frame having suction means thereon for collecting seeds and provided with an air intake, a horizontal wiper bar constituting a structural part of the frame and disposed at said air intake, and a rotary brush supported on the frame over the wiper bar and at the air intake, said brush having wiping contact with said bar for brushing seeds from the tops of grass that are brushed against the bar by the brush, said bar having a cylindrical outer surface providing a smooth rounded surface against which said brush will ride and means for adjusting the vertical position of said wiper bar.

7. The combination of claim 4 wherein said adjusting means comprises a pair of ground wheels supporting the frame and having a common mounting shaft, said bar being hollow and receiving the shaft therein, and means connected to said shaft for rotating the shaft and for locking the shaft in a selected rotated position, laterally projecting arms fixed to the ends of the shaft and holding the ground wheels, said shaft being rotated to selectively raise or lower the frame relative to said wheels to vertically adjust the bar in accordance with the height of grass being harvested.

8. A grass seed harvester comprising a frame including a tubular front horizontal frame member which in addition to its function as a structural member of the frame also constitutes a bearing and a wiper bar, a horizontal rock shaft extending through the frame member, laterally projecting arms fixed to the ends of the rock shaft, ground wheels carried by the arms, means attached to the shaft for locking the same to selectively raise and lower the frame member relative to the ground contacted by the wheels, a power driven brush supported by the frame over the frame member and having bristles that contact the frame member to wipe the tops of grass against the frame member, and suction means on the frame for collecting seeds and including an intake mouth at the frame member and enclosing the brush.

9. A grass seed harvester comprising a frame including a tubular front horizontal frame member which in addition to its function as a structural member of the frame also constitutes a bearing and a wiper bar, a horizontal rock shaft extending through the frame member, laterally projecting arms fixed to the ends of the rock shaft, ground wheels carried by the arms, means attached to the shaft for locking the same to selectively raise and lower the frame member relative to the ground contacted by the wheels, a power driven brush supported by the frame over the frame member and having bristles that contact the frame member to wipe the tops of grass against the frame member, and suction means on the frame for collecting seeds and including an intake mouth at the frame member and enclosing the brush, said intake mouth including an upwardly and forwardly curved plate having contact with the bristles of the brush.

10. A grass seed harvester comprising a frame including a tubular front horizontal frame member which in addition to its function as a structural member of the frame also constitutes a bearing and a wiper bar, a horizontal rock shaft extending through the frame member, laterally projecting arms fixed to the ends of the rock shaft, ground wheels carried by the arms, means attached to the shaft for locking the same to selectively raise and lower the frame member relative to the ground contacted by the wheels, a power driven brush supported by the frame over the frame member and having bristles that contact the frame member to wipe the tops of grass against the frame member, and suction means on the frame for collecting seeds and including an intake mouth at the frame member and enclosing the brush, and hitch means attached to and extending forwardly from said frame member and adapted to be coupled to the rear of a tractor.

11. The combination of claim 8 and means vertically adjustably mounting said brush on the frame to permit adjustment of the brush relative to the frame member.

References Cited in the file of this patent

UNITED STATES PATENTS

| Number | Name | Date |
| --- | --- | --- |
| 383,796 | Burfeind | May 29, 1888 |
| 1,297,349 | Herr | Mar. 18, 1919 |
| 2,351,412 | Dowd et al. | June 13, 1944 |